(12) United States Patent
Omuro et al.

(10) Patent No.: US 7,823,561 B2
(45) Date of Patent: Nov. 2, 2010

(54) METHOD AND APPARATUS FOR CONTROLLING IGNITION TIMING OF AN INTERNAL COMBUSTION ENGINE BASED ON ENGINE ROTARY SPEED

(75) Inventors: Yoshiya Omuro, Saitama (JP); Kenichi Machida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 152 days.

(21) Appl. No.: 12/291,583

(22) Filed: Nov. 12, 2008

(65) Prior Publication Data
US 2009/0151695 A1    Jun. 18, 2009

(30) Foreign Application Priority Data
Dec. 17, 2007    (JP) .............................. 2007-324708

(51) Int. Cl.
*F02P 5/15*  (2006.01)
(52) U.S. Cl. .............................. 123/406.25; 123/406.51
(58) Field of Classification Search ................. 701/110; 123/406.25, 406.33, 406.51
See application file for complete search history.

(56) References Cited

U.S. PATENT DOCUMENTS

| 3,142,967 A | * | 8/1964 | Schweitzer ................. 60/721 |
| 3,791,357 A | * | 2/1974 | Cook ..................... 123/406.51 |
| 3,971,350 A | * | 7/1976 | Hays ..................... 123/406.58 |
| 4,501,137 A | * | 2/1985 | Aoki et al. ................. 73/35.04 |
| 4,986,239 A |   | 1/1991 | Oishi |
| 5,070,840 A |   | 12/1991 | Kanno et al. |
| 6,220,904 B1 |   | 4/2001 | Hoshiba et al. |
| 6,253,143 B1 | * | 6/2001 | Silvernagle et al. ........... 701/93 |
| 6,708,483 B1 | * | 3/2004 | Robichaux et al. ............ 60/286 |

FOREIGN PATENT DOCUMENTS

| JP | 61-192836   | 8/1986 |
| JP | B 7-51925   | 6/1995 |
| JP | 09-100722 A | 4/1997 |
| JP | 09-280149   | 10/1997 |

* cited by examiner

*Primary Examiner*—Erick Solis
(74) *Attorney, Agent, or Firm*—Carrier, Blackman & Associates P.C.; Joseph P. Carrier; William D. Blackman

(57) ABSTRACT

An engine ignition control apparatus includes a standard ignition map for use in retarding ignition timing when a throttle opening is within a predetermined range, and when an engine speed is within a predetermined region; and an acceleration-time advance angle correction quantity map for performing advance angle correction when the engine speed is within the predetermined region; an engine accelerometer for detecting a rate of change of the engine rotary speed; and an acceleration-time advance angle correction quantity setting unit for correcting an advance angle of the ignition timing. When the engine speed is within the predetermined range, and the rate of change of engine rotary speed is greater than or equal a predetermined rate, the acceleration-time advance angle correction quantity setting unit performs attenuation processing for deriving an advance angle correction quantity; and increases an attenuation quantity of the advance angle quantity for every ignition.

20 Claims, 4 Drawing Sheets

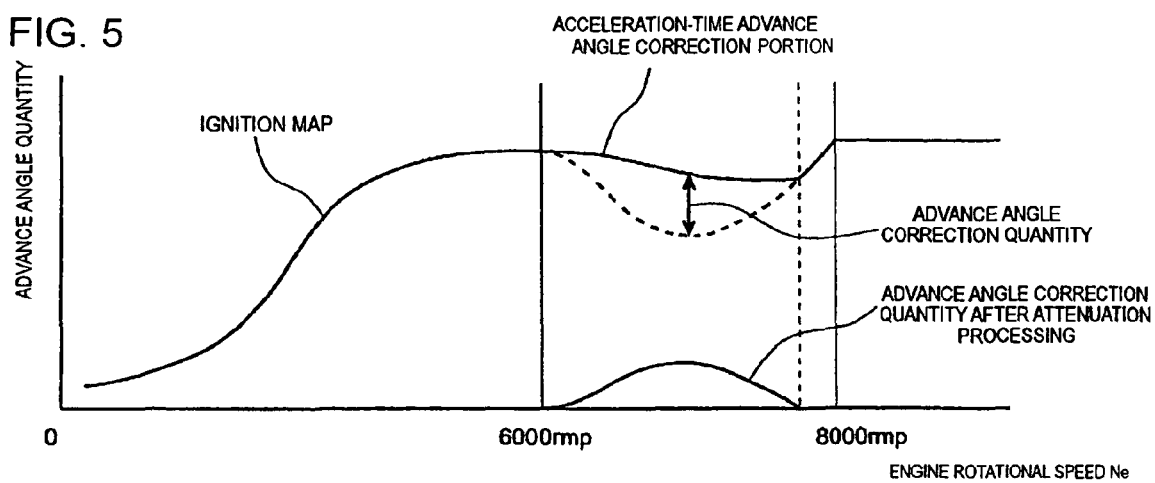

METHOD AND APPARATUS FOR CONTROLLING IGNITION TIMING OF AN INTERNAL COMBUSTION ENGINE BASED ON ENGINE ROTARY SPEED

CROSS-REFERENCE TO RELATED APPLICATIONS

The present application claims priority under 35 USC §119 based on Japanese patent application No. 2007-324708, filed on Dec. 17, 2007. The entire subject matter of this priority document, including specification, claims and drawings, is incorporated by reference herein.

BACKGROUND OF THE INVENTION

1. Field of the Invention

The present invention relates to an engine ignition control apparatus for an internal combustion engine. More particularly, the present invention relates to an engine ignition control method and apparatus which correct an advance angle of ignition timing based on a rate of change of an engine rotary speed.

2. Description of the Background Art

There is a known engine ignition control apparatus which detects an acceleration state of a vehicle, and which adjusts ignition timing in response to the detected acceleration state. An example of an ignition timing control method of this type is disclosed in published Japanese Patent Document JP-B-7-51925.

The ignition timing control method, as disclosed in published Japanese Patent Document JP-B-7-51925, detects an acceleration command operation performed by a rider, based on a change in throttle opening, and applies a retarding angle correction to ignition timing when an engine rotary speed is decreased in such a state, thereby preventing knocking.

However, according to the method of ignition timing control as disclosed in Japanese Patent Document JP-B-7-51925, an acceleration state of the vehicle is detected based on a change in a throttle opening. Accordingly, for example, during the acceleration when a throttle opening is held in a fully open state, it may be difficult to detect whether the vehicle is in an acceleration state based on a change of the throttle opening.

Hence, there exists a drawback in the method of ignition timing control of the Japanese Patent Document JP-B-7-51925, since it is impossible to perform a control for determining ignition timing using a change in a throttle opening, as one of control parameters.

The present invention has been made to overcome such drawbacks of the existing ignition timing control method and apparatus. Accordingly, it is one of the objects of the present invention to provide an engine ignition control apparatus which overcomes the above-mentioned drawback of the related art, and which detects an acceleration state of a vehicle based on a rate of change of an engine rotary speed and appropriately corrects an ignition timing advance angle.

SUMMARY OF THE INVENTION

In order to achieve the above-mentioned objects, the present invention according to a first aspect thereof provides an engine ignition control apparatus having a standard ignition map, which may be recorded on a computer readable medium, for retarding ignition timing in a control region where a throttle opening is greater than or equal to a predetermined throttle opening and when a detected engine rotary speed is within a predetermined high rotary speed range; and an acceleration-time advance angle correction quantity map, which may be recorded on a computer readable medium, for performing the advance angle correction of the ignition timing in response to the engine rotary speed in the control region.

The engine ignition control apparatus, according the first aspect of the present invention, also includes an engine accelerometer (also referred as a rate of change of engine rotary speed detection unit) for detecting a rate of change of the engine rotary speed during acceleration (in the rising direction) of the vehicle; and an acceleration-time advance angle correction quantity setting unit for setting the ignition timing at the time of correcting an advance angle.

When the engine rotary speed is determined within said predetermined high rotary speed range and the rate of change of engine rotary speed is greater than or equal a predetermined rate of change of engine rotary speed, the acceleration-time advance angle correction quantity setting unit performs attenuation processing for deriving an advance angle quantity from the acceleration-time advance angle correction quantity map. The acceleration-time advance angle correction quantity setting unit increases an attenuation quantity of the advance angle quantity for every ignition so as to perform the advance angle correction based on the derived advance angle quantity during said attenuation processing.

Further, the present invention according to a second aspect thereof is characterized in that the attenuation quantity used in the attenuation processing is set to increase at a fixed rate for every ignition from a point of time that the advance angle correction is started.

ADVANTAGES OF THE INVENTION

According to the first aspect of the present invention, an engine ignition control apparatus includes a standard ignition map for retarding ignition timing in a control region where a throttle opening is greater than or equal to a predetermined throttle opening, and when a detected engine rotary speed is within a predetermined high rotary speed range; and an acceleration-time advance angle correction quantity map for performing the advance angle correction of the ignition timing in response to the engine rotary speed in the control region; an engine accelerometer for detecting a rate of change of the engine rotary speed during acceleration of the vehicle; and an acceleration-time advance angle correction quantity setting unit for setting the ignition timing at the time of correcting an advance angle.

According to the first aspect, when the engine rotary speed is determined within said predetermined high rotary speed range and the rate of change of engine rotary speed is greater than or equal a predetermined rate of change of engine rotary speed, the acceleration-time advance angle correction quantity setting unit performs: (1) attenuation processing for deriving an advance angle quantity from the acceleration-time advance angle correction quantity map; and (2) increases an attenuation quantity of the advance angle quantity for every ignition so as to perform the advance angle correction based on the derived advance angle quantity during said attenuation processing.

Due to such configuration, which is different from a technique which detects an acceleration state of a vehicle based on a change of throttle opening, even when the throttle opening is held at fixed opening such as a full open state, it is possible to perform the advance angle correction of the ignition timing by detecting the acceleration state of the vehicle.

Accordingly, in an acceleration state in which the throttle opening is fixed and there is no possibility of occurrence of knocking or the like due to a high rising rate of the engine rotary speed, it is possible to enhance an engine output by performing the advance angle correction of ignition timing of the standard ignition map.

Further, the advance angle correction quantity is subject to the attenuation processing for every ignition. Hence, the influence of the advance angle correction on the engine can be reduced by shortening the advance angle correction period, and at the same time, it is possible to smoothly return the ignition control from the ignition control in a state that the advance angle correction is performed to the ignition control based on the standard ignition map.

According to the second aspect of the present invention, the attenuation quantity used in the attenuation processing is set to increase at a fixed rate for every ignition from a point of time that the advance angle correction is started. Accordingly, it is possible to easily set the number of times of ignition until the ignition control returns to the ignition control based on the standard ignition map after starting the ignition control based on the advance angle correction quantity.

BRIEF DESCRIPTION OF THE DRAWINGS

FIG. 5 is a graph showing an ignition map at time of opening throttle valve in a full open state showing acceleration-time advance angle correction portion, advance angle correction quantity, and advance angle correction quantity after attenuation processing.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

An illustrative embodiment of the present invention is explained in detail hereinafter in conjunction with drawings.

Figure 1:
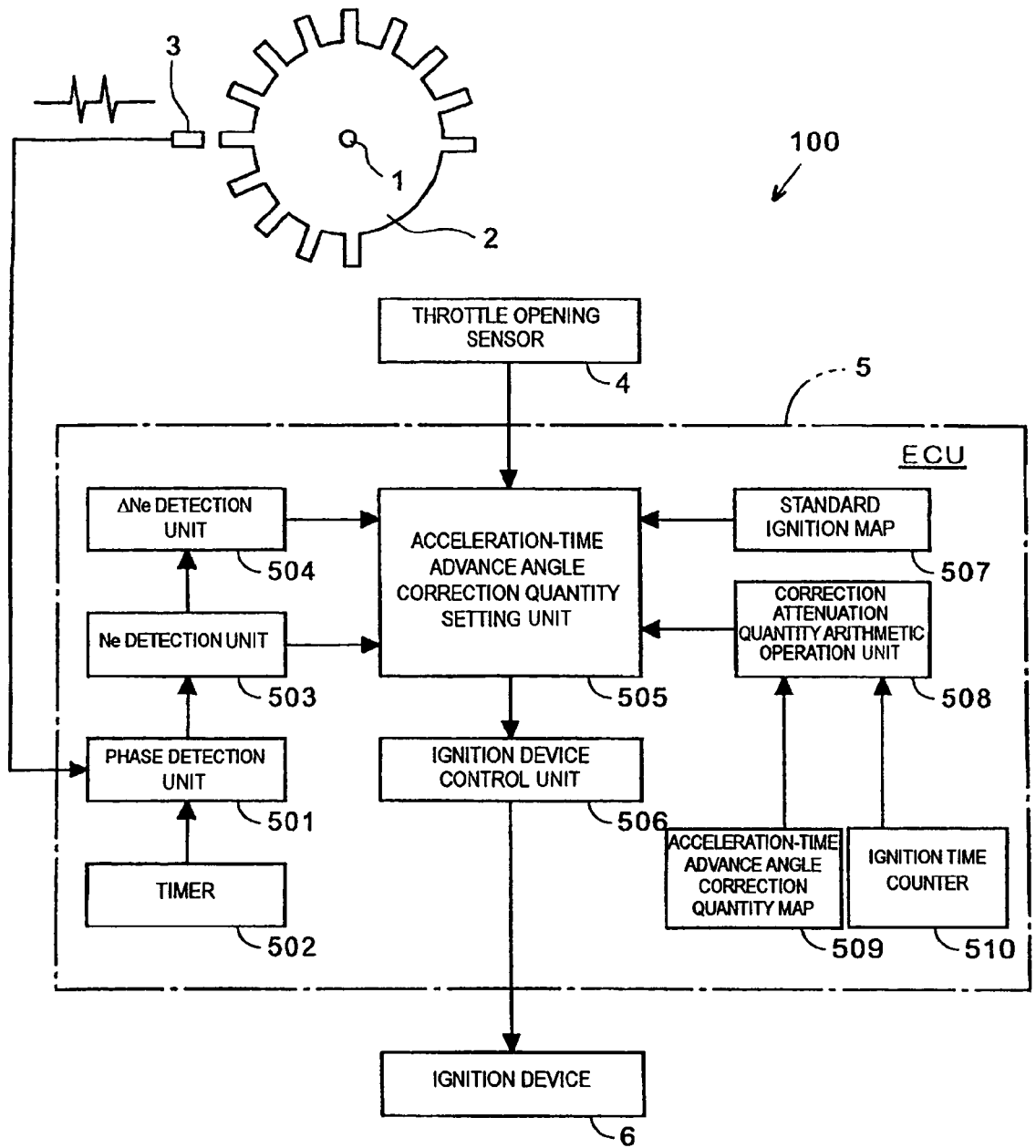
FIG. 1 is a block diagram showing configuration of an engine ignition control apparatus according to an illustrative embodiment of the present invention.

FIG. 1 is a block diagram showing a configuration of an engine ignition control apparatus 100 according to an illustrative embodiment of the present invention. A crankshaft 1 of an engine is provided with a pair of components including a crank pulser rotor 2 having a non-toothed portion and a pulse generator 3. The pair outputs thirteen (13) crank pulses for each one rotation of the crankshaft 1. The crank pulse rotor 2 includes thirteen (13) pieces of projecting portions arranged at intervals of 22.5 degrees, and a non-toothed portion having an angle set to 90 degrees. An output signal transmitted from the pulse generator 3 is received by a phase detection unit 501 housed in an ECU 5.

The phase detection unit 501 detects a phase of the crankshaft 1 based on crank pulses. An Ne detection unit 503 detects an engine rotary speed Ne based on a detection result of the phase detection unit 501 and an output signal from a timer 502 received via the phase detection unit 501. Further, an engine accelerometer (also referred as a ΔNe detection unit) 504 detects a rate of change (ΔNe) of engine rotary speed between two predetermined measuring points based on an output signal from the Ne detection unit 503.

An acceleration-time advance angle correction quantity setting unit 505 receives input signals from the Ne detection unit 503, the ΔNe detection unit 504, a throttle opening sensor 4 which detects throttle opening of the engine, a standard ignition map 507 and a correction attenuation quantity arithmetic operation unit 508. The standard ignition map 507 is stored in a recordable data storage medium. The acceleration-time advance angle correction quantity setting unit 505 determines ignition timing of the engine based on these input signals, and transmits the ignition timing to an ignition control unit 506.

A ignition apparatus 6 having an ignition plug and the like ignites an air-fuel mixture in a combustion chamber of the engine at predetermined ignition timing based on a command received from the ignition apparatus control unit 506. The standard ignition map 507 is a data map for deriving the ignition timing at the time of performing usual, normal driving based on the throttle opening and the engine rotary speed Ne.

In usual driving, the acceleration-time advance angle correction quantity setting unit 505 determines the ignition timing by applying the information received from the throttle opening sensor 4 and the Ne detection unit 503 to the standard ignition map 507. Then, the acceleration-time advance angle correction quantity setting unit 505 transmits such determined ignition timing to the ignition control unit 506.

On the other hand, a correction attenuation quantity arithmetic operation unit 508 has a function of calculating the correction quantity of the ignition timing which is applicable only when the vehicle is in a particular acceleration state based on the information received from an acceleration-time advance angle correction quantity map 509 and an ignition time counter 510. The acceleration-time advance angle correction quantity map 509 is stored in a recordable data storage medium.

Figure 2:
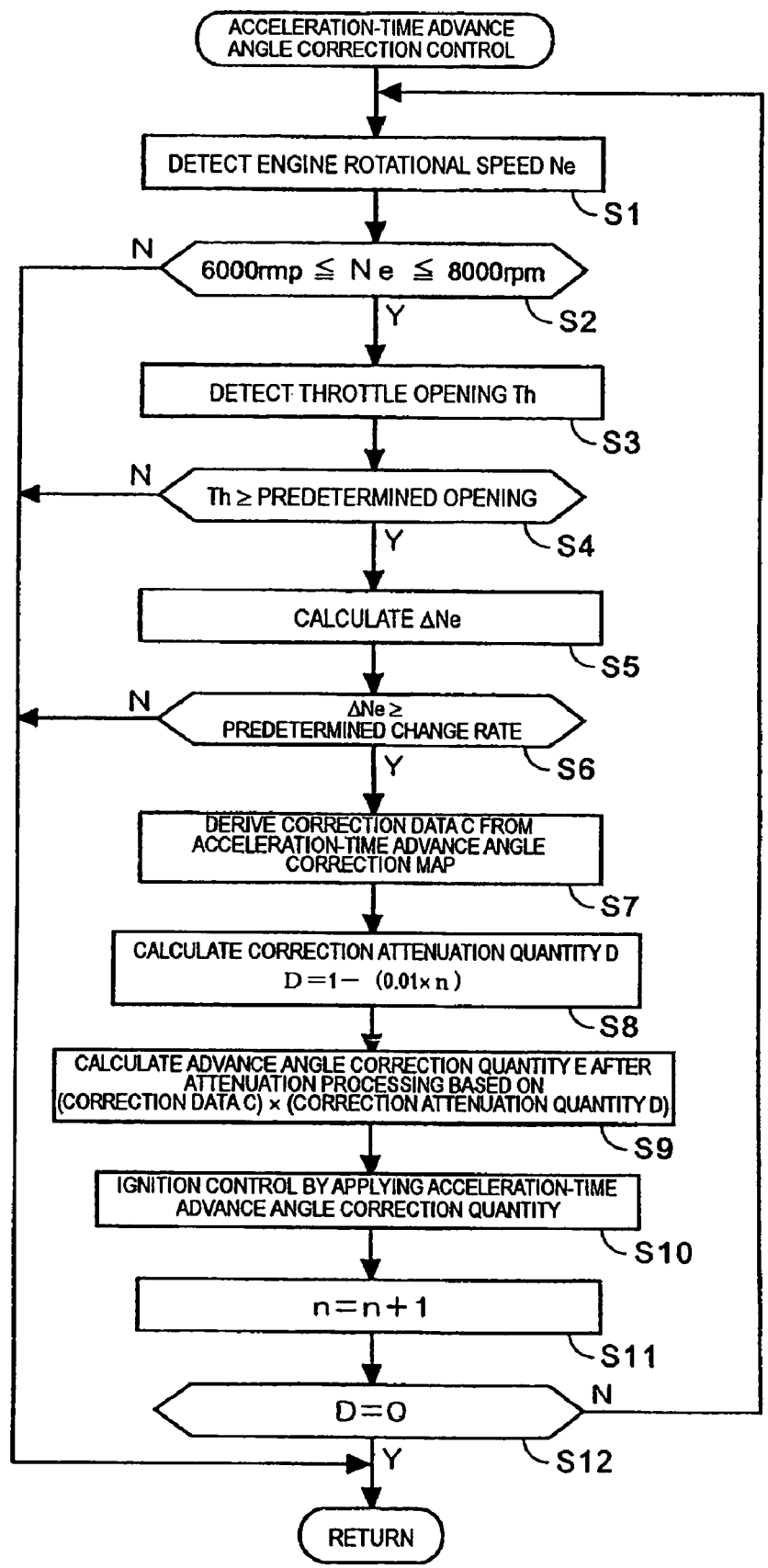
FIG. 2 is a flowchart showing steps of an acceleration-time advance angle correction control according to the illustrative embodiment of the present invention.

FIG. 2 is a flowchart showing the flow of various steps of an acceleration-time advance angle correction control according to an illustrative embodiment of the present invention. Further, FIG. 3 shows the standard ignition map 507 when a throttle valve is in a full open state.

The acceleration-time advance angle correction control is effectively applicable to a situation in which the standard ignition map 507 is set such that the ignition timing is retarded for protecting the engine when the throttle opening is in a predetermined largely-opened state (for example, a full open state) and the engine rotary speed Ne is in a predetermined high rotation region.

Figure 3:
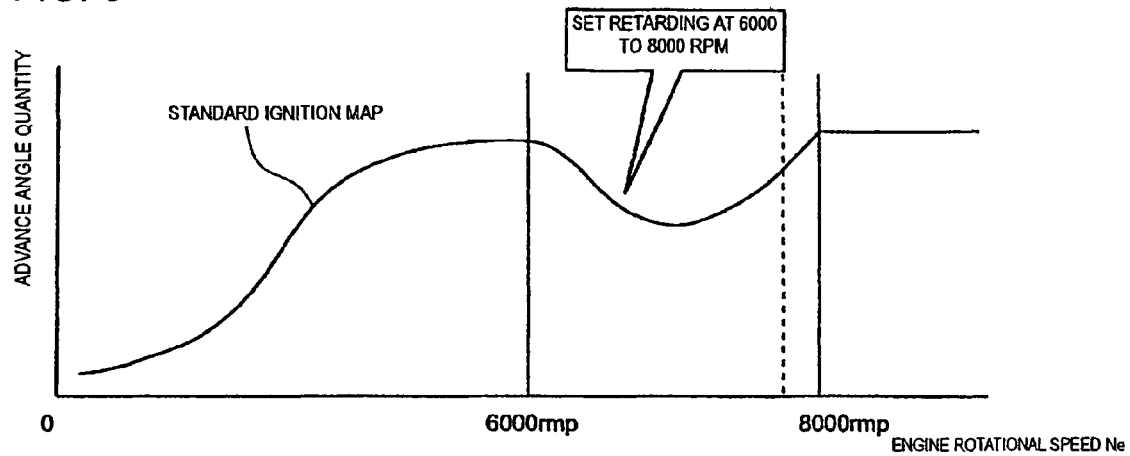
FIG. 3 is a standard ignition map (throttle valve in a full open state) according to an illustrative embodiment of the present invention.

As shown in FIG. 3, the standard ignition map 507 according to of the illustrative embodiment is set such that the ignition timing is retarded in a predetermined high-rotational region of 6000 to 8000 rpm in a throttle-valve full open state. Such retardation setting of the ignition timing is effectively used for definitely protecting the engine by preventing the occurrence of knocking when the engine is in a high load state and a throttle valve is in a full open state.

However, for example, even if the throttle valve is in a full open state, when a rising rate of the engine rotary speed is high, that is, when a vehicle body is smoothly accelerated, the reduction of retardation quantity does not cause a problem provided that the reduction of retardation quantity occurs instantaneously. By performing the reduction of the retardation quantity, the engine output at the time of acceleration can be instantaneously enhanced. Thus, the acquisition of the output characteristic with high feeling of acceleration is realized.

However, in a method which detects an acceleration state of the vehicle body based on a change quantity of a throttle opening sensor, when the throttle opening is fixed to a full open state, it is impossible to detect the acceleration state of the vehicle body. Therefore, in such method, the advance angle correction cannot be performed.

In contrast, according to the engine ignition control apparatus of the illustrative embodiment of the present invention, the engine ignition control apparatus is configured such that by detecting the acceleration state of the vehicle based on a rate of change of the engine rotary speed, the advance angle correction of the ignition timing can be performed, even at the time of vehicle acceleration in which the throttle valve is in a full open state.

As shown in the flowchart of FIG. 2, in step S1, the engine rotary speed Ne is detected by the Ne detection unit 504. Next, in step S2, it is determined whether or not the engine rotary speed Ne is 6000 rpm or more and 8000 rpm or less, that is, it is determined whether or not the engine rotary speed Ne is in a predetermined high rotary speed range. If the determination is affirmative, the processing advances to step S3.

In step S3, the detection of the throttle opening Th is performed based on the information received from the throttle opening sensor 4. In step S4, it is determined whether or not the throttle opening Th is predetermined opening or more (a full open state in this embodiment). If the determination is affirmative, the processing advances to step S5.

In the succeeding step S5, the rate of change ΔNe of the engine rotary speed Ne is calculated by the ΔNe detection unit 504. Then, in step S6, it is determined whether or not the rate of change of change ΔNe is greater than or equal to a predetermined rate of change, and if the determination is affirmative, the processing advances to step S7.

When the affirmative determinations are made in the above-mentioned steps S2, S4 and S6, it is determined that a vehicle is in an acceleration state with ignition timing retarded based on the standard ignition map 507. Accordingly, the advance angle correction control is performed by executing processing in step S7 and in the succeeding steps.

On the other hand, if a negative determination is made in any one of the steps 2, 4 and 6, it is determined that the vehicle is not in an operation state in which the acceleration-time advance angle correction control according to this embodiment is applicable to the vehicle, and a series of control is finished.

Figure 4:
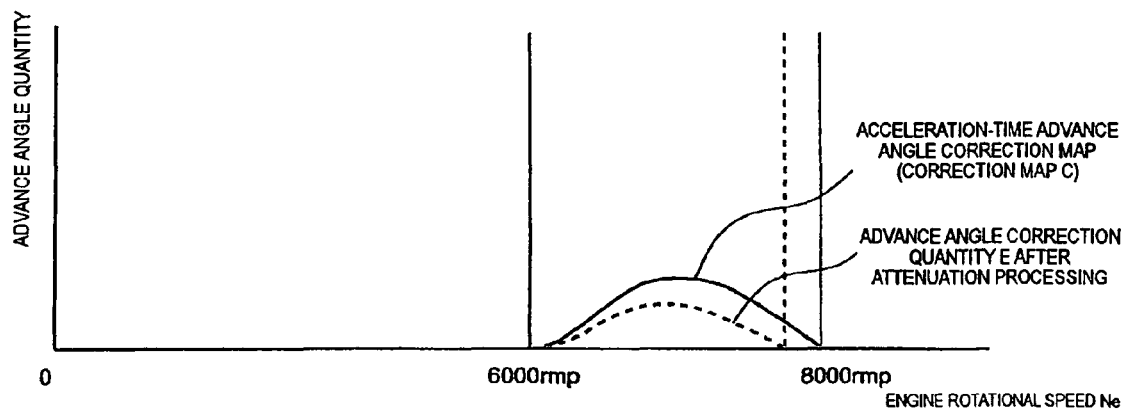
FIG. 4 is an acceleration-time advance angle correction quantity map according to an illustrative embodiment of the present invention.

As described previously, the engine ignition control apparatus of the illustrative embodiment includes the acceleration-time advance angle correction quantity map 509 for performing the advance angle correction in addition to the standard ignition map 507 which is used in usual driving. The acceleration-time advance angle correction quantity map 509, as shown in FIG. 4, defines an advance angle quantity (correction map data C) in a predetermined high rotation range of 6000 rpm to 8000 rpm. An "advance angle correction quantity after attenuation processing" indicated by a broken line in the drawing is described later.

Referring to the flowchart shown in FIG. 2, in step S7, the correction data C corresponding to the current engine rotary speed Ne is derived from the acceleration-time advance angle correction quantity map 509. In subsequent step S8, a correction attenuation quantity D is calculated. This calculation determines an attenuation quantity of the correction data C.

In the illustrative embodiment, the correction attenuation quantity D is obtained by using a calculation formula shown below.

$$D=1-(0.01 \times n)$$

In the correction attenuation quantity D calculation formula, n is the number of times of ignition after starting the advance angle correction and is measured by the ignition time counter 510 (see FIG. 1). According to this calculation formula, for example, the correction attenuation quantity D becomes 0.99 (D=0.99) when the number of times of ignition is 1, i.e., when n=1, which follows the ignition with which the advance angle correction is started. The correction attenuation quantity D becomes 0.98 (D=0.98) in the second ignition (n=2) after starting the advance angle correction, and the correction attenuation quantity D becomes zero (D=0) in the 100th ignition (n=100) after starting the advance angle correction.

In step S9, the advance angle correction quantity E (acceleration-time advance angle correction quantity E) after attenuation processing is calculated based on the above-mentioned correction data C× correction attenuation quantity D.

In subsequent step S10, as shown in FIG. 5, the advance angle correction is applied to a retarded portion set within 6000 to 8000 rpm of the standard ignition map 507 using the advance angle correction quantity E after attenuation processing, and the ignition apparatus is driven using the ignition timing after advance angle correction. Then, in step S11, a numerical value of the ignition time counter 510 is incremented and the processing advances to step S12.

In step S12, it is determined whether or not the correction attenuation quantity D becomes zero (D=0). If the determination in step S12 is negative, the processing returns to step S1. On the other hand, if the determination in step S12 is affirmative, a series of control is finished. The correction attenuation quantity D in step S8 becomes zero when the number of times of ignition becomes 100, as discussed herein. Accordingly, irrespective of the value of the correction data C corresponding to the engine rotary speed, with the 100th ignition after starting the advance angle correction, the advance angle correction quantity E also becomes zero.

As described above, in the engine ignition control apparatus according to the present invention, the fact that the vehicle is in an acceleration state is detected based on a rate of change ΔNe of the engine rotary speed Ne. Accordingly, even when the standard ignition map is set so as to retard the ignition timing in the predetermined high speed region with the throttle opening in a full open state, it is possible to perform the advance angle correction of the retarded portion in conformity with the acceleration state of the vehicle.

Further, the advance angle correction quantity is set such that the advance angle correction quantity is attenuated at a fixed rate for every ignition after starting the advance angle correction. Hence, the advance angle correction can be accurately finished with the predetermined number of times of ignition.

Further, due to the continuous advance angle correction, there is no possibility that a load is imposed on the engine. Hence, an engine output at the time of acceleration can be enhanced thus enabling the acquisition of output characteristic with high feeling of acceleration. Further, since the advance angle quantity is subject to the attenuation processing for every ignition, the ignition control can be smoothly shifted from the control in an advance angle correction state to the control based on the standard ignition map.

Here, the throttle opening for performing the advance angle correction is not limited to the throttle opening fixed to a full-open state in the above-mentioned embodiment, and may be set to opening of greater than or equal to 90% of a maximum throttle opening depending on the setting of the standard ignition map.

Further, modes or set values of the standard ignition map and the acceleration-time advance angle correction map, values of predetermined high rotation regions for retarding the ignition timing with the standard ignition map, an arithmetic operation formula of correction attenuation quantity, setting of the number of times of ignition for performing the advance angle correction and the like are not limited to the above-mentioned embodiment and various modifications are conceivable.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An engine ignition control apparatus comprising:
   an electronic control unit operatively connected to a plurality of sensors in an internal combustion engine of a vehicle, said plurality of sensors comprising a throttle position sensor and an engine speed sensor;
   a standard ignition map stored in a recordable data storage medium for retarding ignition timing when a detected throttle opening is in a control region in which the detected throttle opening is greater than or equal to a predetermined throttle opening, and when a detected engine rotary speed is within a predetermined rotary speed range;
   an acceleration-time advance angle correction quantity map stored in a recordable data storage medium for performing advance angle correction of an ignition timing in response to the engine rotary speed in the control region;
   an engine accelerometer for detecting a rate of change of the engine rotary speed during acceleration of the vehicle; and
   an acceleration-time advance angle correction quantity setting unit for setting the ignition timing at the time of correcting an advance angle;
   wherein, when the detected engine rotary speed is within said predetermined rotary speed range and a detected rate of change of engine rotary speed is greater than or equal to a predetermined rate of change of engine rotary speed, the acceleration-time advance angle correction quantity setting unit is operable:
      to perform an attenuation processing for deriving an advance angle quantity from the acceleration-time advance angle correction quantity map, and
      to increase an attenuation quantity of the advance angle quantity for every ignition so as to perform the advance angle correction based on the derived advance angle quantity during said attenuation processing.

2. An engine ignition control apparatus according to claim 1, further characterized in that the attenuation quantity used in the attenuation processing is set to increase at a fixed rate for every ignition firing from a point of time starting the advance angle correction.

3. An engine ignition control apparatus according to claim 1, wherein said predetermined rotary speed range includes engine speed between 6000 rpm and 8000 rpm.

4. An engine ignition control apparatus according to claim 2, wherein said predetermined rotary speed range includes engine speed between 6000 rpm and 8000 rpm.

5. An engine ignition control apparatus according to claim 1, wherein said predetermined throttle opening is a 90% is of a maximum throttle opening.

6. An engine ignition control apparatus according to claim 1, wherein standard ignition map includes data defining a relationship between an advance angle of said ignition timing and an engine rotary speed.

7. An engine ignition control apparatus according to claim 1, wherein said acceleration-time advance angle correction quantity map includes data defining a relationship between an advance angle of the ignition timing and an engine rotary speed in range between 6000 rpm and 8000 rpm.

8. An engine ignition control apparatus for controlling ignition timing of an internal combustion engine, said engine ignition control apparatus:
   a throttle position sensor for detecting a throttle opening;
   an engine rotary speed sensor for detecting engine rotary speed;
   an engine accelerometer for detecting a rate of change of the engine rotary speed based on input received from said engine rotary speed sensor;
   a standard ignition map stored in a recordable data storage medium for retarding ignition timing when a detected throttle opening is greater than or equal to a predetermined throttle opening, and when a detected engine rotary speed is within a predetermined rotary speed range;
   an acceleration-time advance angle correction quantity map stored in a recordable data storage medium for performing advance angle correction of an ignition timing in response to the engine rotary speed within said predetermined rotary speed range; and
   an acceleration-time advance angle correction quantity setting unit for setting the ignition timing at the time of correcting an advance angle of the ignition timing;
   wherein, when the engine rotary speed is determined within said predetermined rotary speed range, and the rate of change of engine rotary speed is greater than or equal a predetermined rate of change of engine rotary speed, the acceleration-time advance angle correction quantity setting unit performs attenuation processing for deriving an advance angle correction quantity based on the acceleration-time advance angle correction quantity map; and
   wherein said acceleration-time advance angle correction quantity setting unit increases an attenuation quantity of the advance angle quantity for every ignition so as to perform the advance angle correction based on the derived advance angle quantity during said attenuation processing.

9. An engine ignition control apparatus according to claim 8, is characterized in that the attenuation quantity applied in the attenuation processing is set to increase at a fixed rate for each ignition from a point of time of starting of the advance angle correction.

10. An engine ignition control apparatus according to claim 8, wherein said predetermined rotary speed range includes engine speed between 6000 rpm and 8000 rpm.

11. An engine ignition control apparatus according to claim 10, wherein said predetermined rotary speed range includes engine speed between 6000 rpm and 8000 rpm.

12. An engine ignition control apparatus according to claim 8, wherein said predetermined throttle opening is a 90% is of a maximum throttle opening.

13. An engine ignition control apparatus according to claim 8, wherein standard ignition map includes data defining a relationship between an advance angle of said ignition timing and an engine rotary speed.

14. An engine ignition control apparatus according to claim 8, wherein said acceleration-time advance angle correction quantity map includes data defining a relationship between an advance angle of the ignition timing and an engine rotary speed in said control region.

15. A method of controlling ignition timing for an internal combustion engine, said method comprising the steps of
  a) monitoring a throttle opening using a throttle position sensor;
  b) monitoring an engine rotary speed using an engine speed sensor;
  c) calculating a rate of change of the engine rotary speed;
  d) when a detected throttle opening is greater than or equal to a predetermined throttle opening, and when a detected engine rotary speed is within a predetermined rotary speed range, retarding ignition timing using a standard ignition map;
  e) performing advance angle correction of an ignition timing in response to the engine rotary speed within said predetermined rotary speed range using an acceleration-time advance angle correction quantity map; and
  f) setting the ignition timing at the time of correcting an advance angle of the ignition timing using an acceleration-time advance angle correction quantity setting unit;
  wherein, when the engine rotary speed is determined within said predetermined rotary speed range, and the rate of change of engine rotary speed is greater than or equal a predetermined rate of change of engine rotary speed, the acceleration-time advance angle correction quantity setting unit performs attenuation processing for deriving an advance angle correction quantity based on the acceleration-time advance angle correction quantity map; and
  wherein said acceleration-time advance angle correction quantity setting unit increases an attenuation quantity of the advance angle quantity for every ignition so as to perform the advance angle correction based on the derived advance angle quantity during said attenuation processing.

16. A method of controlling ignition timing for an internal combustion engine according to claim 15, is characterized in that the attenuation quantity applied in the attenuation processing is set to increase at a fixed rate for each ignition from a point of time of starting of the advance angle correction.

17. A method of controlling ignition timing for an internal combustion engine according to claim 15, wherein said predetermined rotary speed range includes engine speed between 6000 rpm and 8000 rpm.

18. A method of controlling ignition timing for an internal combustion engine according to claim 15, wherein said predetermined throttle opening is a 90% is of a maximum throttle opening.

19. A method of controlling ignition timing for an internal combustion engine according to claim 15, wherein standard ignition map includes data defining a relationship between an advance angle of said ignition timing and an engine rotary speed.

20. A method of controlling ignition timing for an internal combustion engine according to claim 15, wherein said acceleration-time advance angle correction quantity map includes data defining a relationship between an advance angle of the ignition timing and an engine rotary speed in said control region.

* * * * *